W. R. CROSS.
ANIMATED TOY BOOK.
APPLICATION FILED SEPT. 21, 1914.

1,139,643.

Patented May 18, 1915.

WITNESSES
E. C. Skinkle
H. D. Kilgore

INVENTOR
William R. Cross
BY HIS ATTORNEYS

UNITED STATES PATENT OFFICE.

WILLIAM R. CROSS, OF MINNEAPOLIS, MINNESOTA.

ANIMATED TOY BOOK.

1,139,643.

Specification of Letters Patent.

Patented May 18, 1915.

Application filed September 21, 1914. Serial No. 862,868.

*To all whom it may concern:*

Be it known that I, WILLIAM R. CROSS, a citizen of the United States, residing at Minneapolis, in the county of Hennepin and State of Minnesota, have invented certain new and useful Improvements in an Animated Toy Book; and I do hereby declare the following to be a full, clear, and exact description of the invention, such as will enable others skilled in the art to which it appertains to make and use the same.

My invention is in the nature of an animated toy book which, as preferably designed, is illustrative of various animals, and which is not only adapted for the amusement of children, but also for their instruction.

Generally stated, the invention consists of the novel construction and arrangement of parts hereinafter described and defined in the claims.

The figures, which are preferably made to represent various different animals, are so mounted on certain of the leaves of the book that they will be folded into, or between the leaves of the book when the book is closed, but will automatically spring or move into erect or other projected positions when the leaves between which they are contained, are opened up.

In the accompanying drawings which illustrate the invention, like characters indicate like parts throughout the several views.

Figure 1:
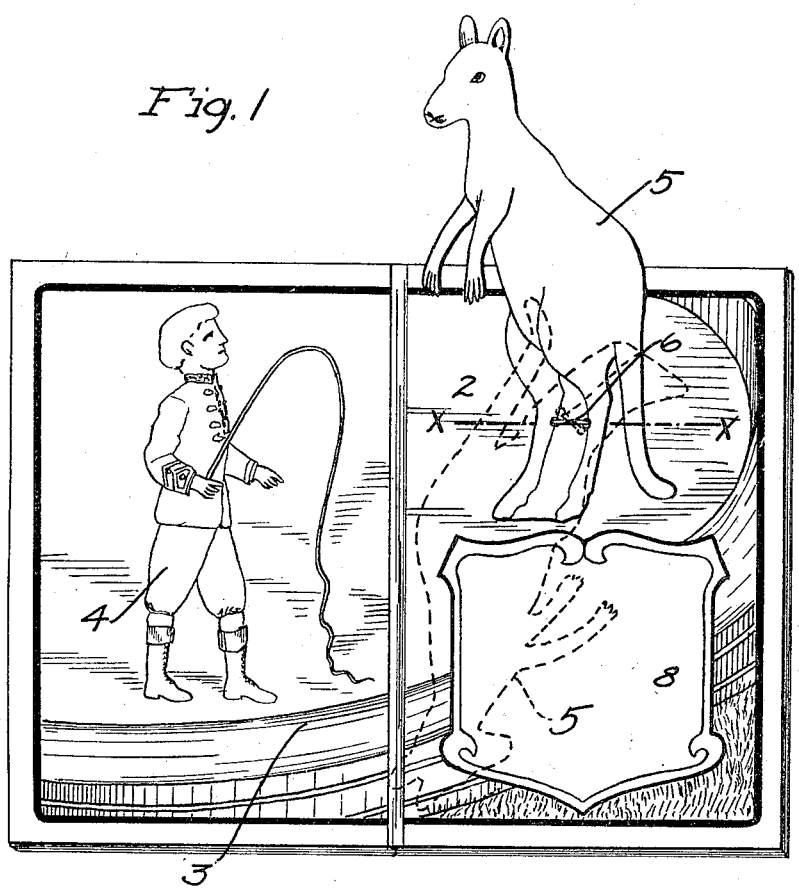
Figure 2:
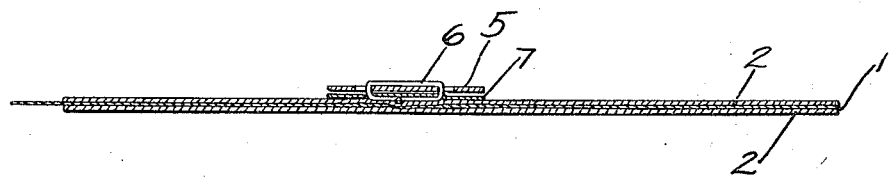

Referring to the drawings: Figure 1 is a plan view showing the book opened up and one of the animal figures turned into an elevated position; and Fig. 2 is an enlarged section taken on the line $x^2$ $x^2$ on Fig. 1.

The book may have any desired number of leaves, and the leaves may be of various different construction. As shown, each leaf is made up of a central cloth sheet 1 having paper facings 2, the thicknesses of which are exaggerated in Fig. 2. With this arrangement, the paper facings 2 are omitted at the centers or hinge line of the book so as to adapt the leaves to be readily folded and to be bound together.

The facings of the leaves which fold together are preferably arranged as supplemental, one to the other and marked with a representation of a circus ring or stage 3, which is partly on each of the said leaves. On one of the leaves is the fixed figure, such as the representation of a boy or man 4, with a whip, and indicative of an animal trainer or ring master. On the other leaf is a movable figure representing some animal, the illustration shown being that of a kangaroo. This figure 5 is formed independently of the leaves and is pivotally connected to one of the leaves and under elastic or spring tension to move from its dotted line position in Fig. 1, into its upright full line position in Fig. 1. This elastic pivotal connection is preferably made by a small rubber band 6 passed through the leg-forming portions of the figure 5 and through an anchoring clip or plate 7, preferably of strong paper and which is secured by adhesive material to the leaf to which the figure 5 is pivoted. This rubber band 6 tends to hold the figure 5 in the projected position shown in full lines in Fig. 1, but it will readily yield to permit the figure to be turned into the dotted line position in Fig. 1, so that when the book is closed, the said figure will be held entirely protected between the folded leaves. When the leaves are opened up, the animal figure 5, will be automatically flipped into the projected full line position shown. Of course, it must be forced back into its dotted line position by hand.

In practice, the book is provided with a large number of leaves and between each pair of leaves will be mounted one of the series of different figures representing animals, or other objects. On the leaves to which the figures are pivoted, just below the figures, are preferably outlined spaces 8, in which a nursery rhyme, or descriptive matter relating to the adjacent figure may be printed or written.

An animated book of the kind described will afford children a great deal of amusement and for this reason, may be used to a great advantage for instructive purposes. The book is well adapted for use in kindergarten work.

What I claim is:

1. A book having leaves, to certain of which object representative figures are pivotally mounted and provided with yielding means tending to move the said figures into projected positions, the said figures being adapted to be turned into position between the folded leaves.

2. In a book provided with leaves, the adjacent faces of which are marked to represent a ring or stage, a figure of a human being marked on one of the said leaves, an animal representing figure pivotally mounted on the adjacent leaf, and a yielding device tending to rotate said animal representing figure into a projected position, and which figure is adapted to be turned between the folded leaves against the tension of the said yielding means.

3. In a book having a plurality of leaves, the combination with an object representing figure, and an elastic band pivotally connecting said figure to one of the said leaves and tending to rotate the same into a projected position, and which figure is adapted to be turned between the adjacent folded leaves.

In testimony whereof I affix my signature in presence of two witnesses.

WILLIAM R. CROSS.

Witnesses:
ALICE L. KING,
HARRY D. KILGORE.

Copies of this patent may be obtained for five cents each, by addressing the "Commissioner of Patents, Washington, D. C."